US010512962B2

(12) United States Patent
Kuriki et al.

(10) Patent No.: US 10,512,962 B2
(45) Date of Patent: Dec. 24, 2019

(54) PIERCING METHOD WITH HEATING

(75) Inventors: Ken Kuriki, Kariya (JP); Takashi Hoshiyama, Obu (JP); Yuusuke Hara, Anjo (JP)

(73) Assignee: DENSO CORPORATION, Kariya (JP)

( * ) Notice: Subject to any disclaimer, the term of this patent is extended or adjusted under 35 U.S.C. 154(b) by 662 days.

(21) Appl. No.: 13/234,859

(22) Filed: Sep. 16, 2011

(65) Prior Publication Data

US 2012/0111161 A1    May 10, 2012

(30) Foreign Application Priority Data

Nov. 9, 2010    (JP) .................................. 2010-250632

(51) Int. Cl.
*B21D 28/24*   (2006.01)
*B21D 28/26*   (2006.01)
*B23K 26/38*   (2014.01)
*B26D 7/10*    (2006.01)

(52) U.S. Cl.
CPC ............. *B21D 28/26* (2013.01); *B21D 28/24* (2013.01); *B23K 26/38* (2013.01); *B26D 7/10* (2013.01); *Y10T 83/0414* (2015.04); *Y10T 83/283* (2015.04); *Y10T 83/9423* (2015.04); *Y10T 83/9428* (2015.04)

(58) Field of Classification Search
CPC .......... B26D 7/10; B21D 28/26; B21D 28/24; B21D 28/32; B23K 28/02; Y10T 83/041; Y10T 83/0414; Y10T 83/283; Y10T 83/9416; Y10T 83/9418; Y10T 83/9423; Y10T 83/9428
USPC ............. 83/16, 15, 170, 681, 682, 684, 686; 228/13
See application file for complete search history.

(56) References Cited

U.S. PATENT DOCUMENTS

| 5,573,170 | A | * | 11/1996 | Sasaki et al. | ........ | B23K 20/023 228/13 |
| 2009/0057281 | A1 | | 3/2009 | Takeshita et al. | | |

FOREIGN PATENT DOCUMENTS

| DE | 24 19 382 A1 | 11/1975 |
| DE | 102 48 207 A1 | 5/2004 |
| DE | 10 2007 008 653 A1 | 8/2008 |
| JP | A-06-163554 | 6/1994 |
| JP | A-09-066420 | 3/1997 |
| JP | A-2007-038352 | 2/2007 |
| JP | A-2007-319912 | 12/2007 |

(Continued)

OTHER PUBLICATIONS

Oct. 16, 2012 Office Action issued in Japanese Patent Application No. 2010-250632 (with translation).

(Continued)

*Primary Examiner* — Clark F Dexter
(74) *Attorney, Agent, or Firm* — Oliff PLC

(57) ABSTRACT

The present invention relates to a piercing apparatus and a piercing method which drive a punch. The piercing apparatus includes a local heating device for heating part of the workpiece in a temperature range less than a melting point of the workpiece and a punch driving device for driving the punch toward the part of the workpiece which was heated by the local heating device. The piercing method includes a local heating step for heating part of the workpiece in a temperature range less than a melting point of the workpiece and a stamping step for driving the punch toward the part of the workpiece which was heated in the local heating step.

4 Claims, 4 Drawing Sheets

(56) References Cited

FOREIGN PATENT DOCUMENTS

| | | | | |
|---|---|---|---|---|
| JP | A-2009-050901 | 3/2009 | | |
| WO | WO 85/02141 | * 5/1985 | ............... | B26D 7/10 |

OTHER PUBLICATIONS

Jun. 6, 2016 Office Action issued in German Patent Application No. 10 2011 054 988.9.

* cited by examiner

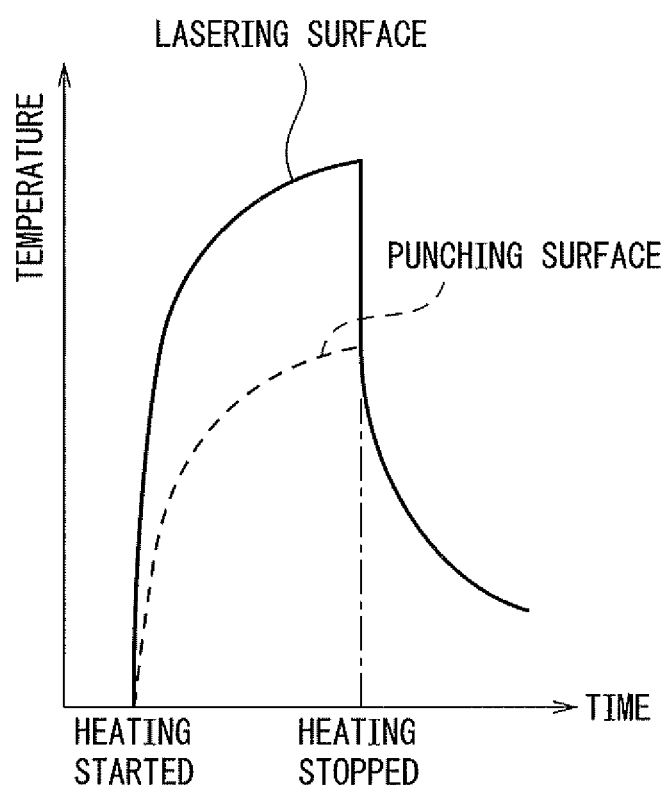

PIERCING METHOD WITH HEATING

BACKGROUND OF THE INVENTION

1. Field of the Invention

The present invention relates to a piercing apparatus and piercing method which drive a columnar shaped punch in an axial direction to pierce a hole in a workpiece.

2. Description of the Related Art

In the past, in a piercing apparatus which pierces a hole by stamping using a punch, there was the issue that the larger the ratio between a length L and diameter D of the hole (hereinafter, referred to as the "L/D"), the greater the possibility of the punch buckling became. Therefore, a piercing apparatus which can pierce a hole, without using a punch, by electro-discharge machining or laser cutting has been considered.

In this regard, when using electro-discharge machining to pierce a hole, there is the issue that the processing time becomes longer than with stamping and the productivity therefore falls. Further, when using laser cutting to pierce a hole, while the drop in productivity can be avoided, there is the issue that the dimensional precision of the hole, the surface properties, and other aspects of work quality become inferior compared with stamping or electro-discharge machining. Therefore, for the purpose of achieving both good productivity and work quality, for example, the piercing apparatus described in Japanese Patent Publication (A) No. 2009-050901 has been proposed.

The piercing apparatus of Japanese Patent Publication (A) No. 2009-050901 is provided with a laser head, punch, and die and pierces a hole by jointly using laser cutting and stamping. That is, according to the piercing apparatus of Japanese Patent Publication (A) No. 2009-050901, laser cutting is used to pierce a rough hole in a workpiece, then a punch larger in diameter than the rough hole is used to stamp the workpiece so as to cut away the peripheral edges of the rough hole. Due to this, the piercing apparatus of Japanese Patent Publication (A) No. 2009-050901 tries to achieve both good productivity and work quality while reducing the possibility of the punch buckling.

However, according to the piercing apparatus of Japanese Patent Publication (A) No. 2009-050901, axial alignment of the rough hole formed by the laser and the stamping by the punch was complicated and created a new issue.

SUMMARY OF THE INVENTION

The present invention was made so as to deal with the above issues and has as its object to provide a piercing apparatus and piercing method able to achieve both good productivity and work quality wherein it is possible to pierce a hole of a large L/D while reducing the possibility of punch buckling.

A first aspect of the present invention provides a piercing apparatus adapted for driving a columnar shaped punch in an axial direction to pierce a hole in a workpiece. The piercing apparatus comprises a local heating means for locally heating part of a workpiece in a temperature range less than a melting point of the workpiece and a punch driving means for driving the punch in an axial direction toward the part of the workpiece which was heated by the local heating means.

Due to this, it is possible to cause the workpiece to locally soften and therefore locally cause the formation of a part with a small deformation resistance and to enable the part with the small deformation resistance to be stamped by the punch, so it is possible to reduce the possibility of punch buckling and easily pierce a hole with a large L/D. Further, the process of piercing a hole becomes stamping using a punch plus local heating of the workpiece, so the processing time does not become that long and the productivity does not fall either. Furthermore, since stamping is used to pierce the hole, the work quality does not fall either. Due to the above, it is possible to provide a piercing apparatus enabling achievement of both good productivity and work quality which can pierce a hole with a large L/D while reducing the possibility of punch buckling.

Further, the workpiece is not heated and softened as a whole, but is locally heated and softened, so it is possible to reduce the deformation region which occurs at the surroundings of a hole along with stamping and to reduce the energy which is required for heating.

Furthermore, when using stamping to pierce a hole, usually a die having a hole corresponding to the hole to be pierced in the workpiece is required (hereinafter the die side hole being referred to as a "die hole"), so it is necessary to align the position of the workpiece where the hole is to be pierced with the die hole and then use the punch to stamp the workpiece. That is, it is necessary to support the workpiece by the die cutting edges formed by the peripheral edges of the die hole against the pressing force by the punch so that the die cutting edges cause cracks in the workpiece and remove the material corresponding to the hole.

As opposed to this, according to the piercing apparatus of the first aspect of the present invention, it is possible to locally heat and soften the workpiece and thereby utilize the difference in deformation resistance based on the temperature difference so as to remove the material corresponding to the hole. For this reason, it is possible to pierce a hole in a workpiece without using a die, so when piercing a hole in a workpiece of a shape difficult to place a die for, it is possible to pierce the hole without struggling to place the die.

In the piercing apparatus of the first aspect of the present invention, the punch receives a working load as a reaction force from the workpiece while stamping the workpiece. Further, the working load is smaller than the buckling load of the punch due to the softening of the workpiece accompanying heating by the local heating means. Due to this, it is possible to reliably prevent buckling of the punch during stamping.

In the piercing apparatus of the first aspect of the present invention, the local heating means may be a laser generator, and the part of the workpiece may be heated by a laser beam which is generated by the laser generator. Due to this, it is possible to freely change the heating region, heating temperature, and other settings at the workpiece.

In the piercing apparatus of the first aspect of the present invention, the part of the workpiece may have a lasering surface which the laser beam directly strikes and a punching surface which the front end of the punch hits. The punch pierces the hole by stamping the workpiece from the punching surface toward the lasering surface and receives a working load as a reaction force from the workpiece while stamping the workpiece. Further, the laser generator may set the heating conditions by the laser beam so that the temperature of the lasering surface becomes less than the melting point of the workpiece and so that softening of the workpiece accompanying heating causes the working load to become smaller than the buckling load of the punch. Due to this, it becomes possible to reliably prevent the punch from buckling while keeping the workpiece from melting and keeping the hole diameter precision and surface properties from dropping.

The piercing apparatus of the first aspect of the present invention may further comprise a control means for controlling the laser generator and punch driving means. The control means can control the laser generator and punch driving means so that the workpiece starts to be stamped by the punch after the laser generator stops generating the laser beam and a laser beam no longer strikes the lasering surface. Due to this, it is possible to block the laser beam from damaging the punch and possible to end the stamping by the punch before cooling after stopping the laser heating causes the deformation resistance to increase.

A second aspect of the present invention provides a piercing method by driving a columnar shaped punch in an axial direction to pierce a hole in a workpiece. The piercing method includes a local heating step for locally heating part of a workpiece in a temperature range less than a melting point of the workpiece and a stamping step for driving the punch in an axial direction toward the part of the workpiece which was heated by the local heating step and using the punch to stamp the workpiece. Due to this, it is possible to obtain similar effects to the case of the first aspect of the present invention.

In the piercing method of the second aspect of the present invention, the punch receives a working load as a reaction force from the workpiece while stamping the workpiece. Further, the working load is smaller than the buckling load of the punch due to the softening of the workpiece accompanying heating by the local heating step. Due to this, it is possible to obtain similar effects to the case of the first aspect of the present invention.

In the piercing method of the second aspect of the present invention, the local heating step may be performed using a laser generator, and the part of the workpiece may be heated by a laser beam which the laser generator emits. Due to this, it is possible to obtain similar effects to the case of the first aspect of the present invention.

In the piercing method of the second aspect of the present invention, part of the workpiece may have a lasering surface which the laser beam directly strikes and a punching surface which the front end of the punch hits. The punch pierces the hole by stamping the workpiece from the punching surface toward the lasering surface and receives a working load as a reaction force from the workpiece while stamping the workpiece. Further, the laser generator may set the heating conditions by the laser beam so that the temperature of the lasering surface becomes less than the melting point of the workpiece and so that softening of the workpiece accompanying heating causes the working load to become smaller than the buckling load of the punch. Due to this, it is possible to obtain similar effects to the case of the first aspect of the present invention.

In the piercing method of the second aspect of the present invention, it is preferable to start the stamping of the workpiece by the punch in the stamping step after the laser generator stops generating the laser beam and a laser beam no longer strikes the lasering surface. Due to this, it is possible to obtain similar effects to the case of the first aspect of the present invention.

The present invention may be more fully understood from the description of preferred embodiments of the invention, as set forth below, together with the accompanying drawings.

BRIEF DESCRIPTION OF THE DRAWINGS

In the drawings:

FIG. 2 is a time chart showing temperature trends at a lasering surface and a punch surface accompanying laser heating start and heating stop.

DESCRIPTION OF THE PREFERRED EMBODIMENTS

The piercing apparatus of an embodiment of the present invention drives a columnar shaped punch in the axial direction to pierce a hole in a workpiece. Further, the piercing apparatus comprises a local heating means for locally heating part of a workpiece in a temperature range less than a melting point of the workpiece and a punch driving means for driving the punch in an axial direction toward the part of the workpiece which was heated by the local heating means.

The punch receives a working load as a reaction force from the workpiece while stamping the workpiece. Further, the working load is smaller than the buckling load of the punch due to the softening of the workpiece accompanying heating by the local heating means. Further, the local heating means is a laser generator, and part of the workpiece is heated by a laser beam which is generated by the laser generator.

Part of the workpiece has a lasering surface which the laser beam directly strikes and a punching surface which the front end of the punch hits. The punch pierces the hole by stamping the workpiece from the punching surface toward the lasering surface. Further, the laser generator sets the heating conditions by the laser beam so that the temperature of the lasering surface becomes less than the melting point of the workpiece and so that softening of the workpiece accompanying heating causes the working load to become smaller than the buckling load of the punch.

Furthermore, the piercing apparatus further comprises a control means for controlling the laser generator and punch driving means. The control means controls the laser generator and punch driving means so that the workpiece starts to be stamped by the punch after the laser generator stops generating the laser beam and a laser beam no longer strikes the lasering surface.

Figure 1A:
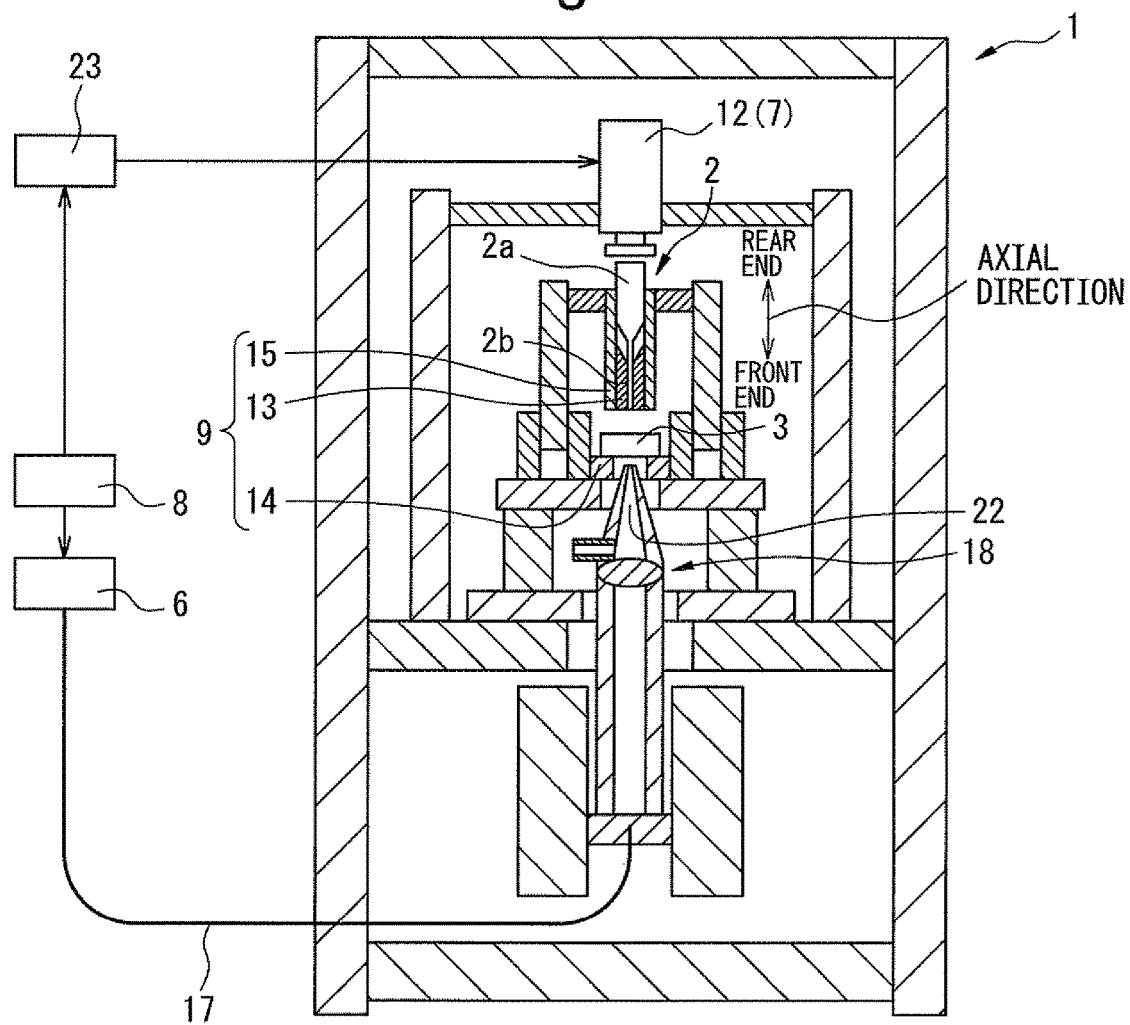
FIG. 1A is a cross-sectional view showing the overall configuration of a piercing apparatus according to an embodiment of the present invention.
Figure 1B:
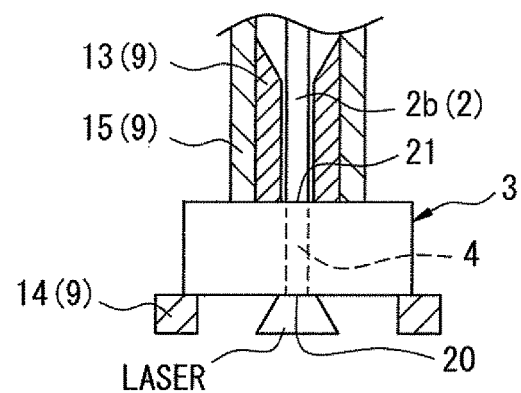
FIG. 1B is a cross-sectional view showing the configuration of principal parts of the piercing apparatus.
Figure 3A:
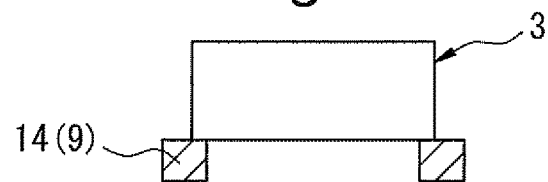
FIG. 3A is an explanatory view showing the state of placing a workpiece on a workpiece setting table in the piercing apparatus.
Figure 3B:
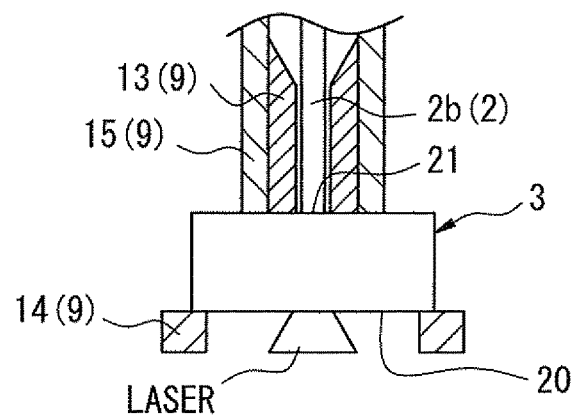
FIG. 3B is an explanatory view showing the state of using a workpiece holder and punch guide to hold down a workpiece and using a laser beam to heat the workpiece in the piercing apparatus.
Figure 3C:
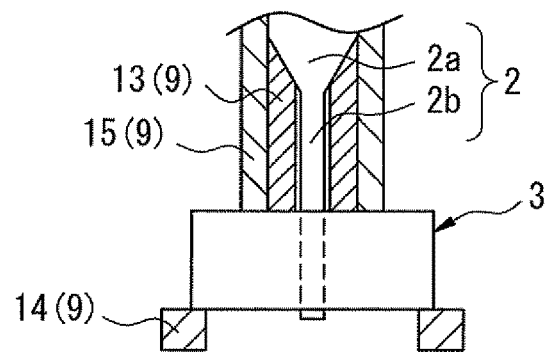
FIG. 3C is an explanatory view showing the state of using a punch to stamp a workpiece.
Figure 3D:
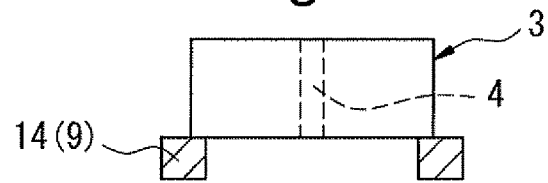
FIG. 3D is an explanatory view showing the state of pulling up a punch together with the workpiece holder and punch guide.

The configuration of the piercing apparatus 1 of the present embodiment will be explained based on FIG. 1A and FIG. 1B. The piercing apparatus 1 drives a columnar shaped punch 2 in an axial direction to pierce a hole 4 in the workpiece 3. For example, it can pierce a hole 4 without the punch 2 buckling even in the case where the L/D is 2 or more.

The piercing apparatus 1 is, for example, utilized for piercing an injection hole in a workpiece 3 of the body of an injector for injecting fuel into a combustion chamber of an internal combustion engine or utilized for providing a fuel inflow/outflow passage for a back pressure chamber in a workpiece 3 of a plate forming a back pressure chamber of the injector. Note that, the material of the punch 2 is, for example, a cemented carbide comprised of tungsten carbide and a binder of cobalt mixed together and sintered.

The piercing apparatus 1 comprises a local heating means 6 for locally heating part of the workpiece 3 in a temperature range less than a melting point of the workpiece 3, a punch driving means 7 for driving the punch 2 in an axial direction toward the part of the workpiece 3 which was heated by the local heating means 6, a control means 8 for controlling the local heating means 6 and punch driving means 7, and a workpiece holding means 9 for holding the workpiece 3.

The punch driving means 7 is, for example, comprised of an air cylinder 12 which generates a drive force for driving the punch 2. Further, the workpiece holding means 9 is, for example, comprised of a punch guide 13 which holds the front end of the punch 2 in a slidable manner and guides movement of the punch 2 in the axial direction, a workpiece setting table 14 which carries the workpiece 3, a workpiece holder 15 which holds the punch guide 13 at its inner circumferential side and holds down the workpiece 3 carried on the workpiece setting table 14, etc.

Note that, the workpiece holder 15 also functions, for example, as a punch holder which holds a rear end 2a of the punch 2 in a slidable manner. Further, the front end 2b of the punch 2 which is guided by the punch guide 13 is provided elongated in accordance with the diameter of the hole 4. The hole 4 is pierced by the front end 2b stamping the workpiece 3. Further, the rear end 2a is provided larger in diameter than the front end 2b.

The rear end face of the punch guide 13 and the front end face of the rear end 2a are provided in a tapered shape, respectively, so as to be reduced in diameter toward the front end sides so that, for example, the rear end 2a mates with the punch guide 13. Furthermore, the punch 2, the punch guide 13, and the front end of the workpiece holder 15 are configured to become the same position in the axial direction in the state pulled up from the workpiece 3.

The local heating means 6 causes part of the workpiece 3 to locally soften so as not to melt so as to locally cause the formation of a part with a small deformation resistance. By locally causing the formation of a part with a small deformation resistance in the workpiece 3, the working load is made smaller than the buckling load of the punch 2. Here, the "working load" is the reaction force which the punch 2 receives from the workpiece 3 while stamping the workpiece 3. If the working load is larger than the buckling load of the punch 2, the punch 2 ends up buckling. Therefore, heating by the local heating means 6 is used to soften the workpiece 3 in a range not melting it so as to reduce the deformation resistance and make the working load smaller than the buckling load of the punch 2.

The local heating means 6 may, for example, be a laser generator (hereinafter, the local heating means 6 is assumed to be the laser generator 6). Part of the workpiece 3 is heated and softened by a laser beam which is generated by the laser generator 6. That is, the laser beam which is generated by the laser generator 6 passes through an optical fiber 17 to reach the laser head 18, is condensed by the laser head 18 and fired toward the workpiece 3, and heats the workpiece 3 to make it soften.

Here, part of the workpiece 3 has a lasering surface 20 which the laser beam directly strikes and a punching surface 21 which is positioned at the opposite side to the lasering surface 20 and which the front end of the punch 2 hits. The punch 2 pierces the hole 4 by stamping the workpiece 3 from the punching surface 21 toward the lasering surface 20. Further, the laser head 18 is arranged so that the front end of the nozzle 22 faces the lasering surface 20 of the workpiece 3 placed on the workpiece setting table 14. Furthermore, the laser head 18 and the punch 2 are positioned so that for example the fired axis of the laser beam and the axial center of the punch 2 become coaxial.

For this reason, the workpiece 3 which was heated by the laser beam is stamped by the punch 2 without being moved to another location, that is, while remaining at the same location. Here, for example, as shown in FIG. 2, the temperature at the lasering surface 20 and punching surface 21 from the start of heating by the laser beam to the elapse of a predetermined time after the stop of heating sharply rises along with the start of heating, then gradually becomes gentler in gradient of rise, finally sharply falls along with the stop of heating, then gradually becomes gentler in gradient of fall. For this reason, after the heating is stopped, the deformation resistance rapidly increases and ends up exceeding the buckling load of the punch 2.

Therefore, if trying to move the heated workpiece 3 to another location for stamping by the punch 2, it is necessary to move the workpiece 3 extremely fast and accurately. The movement operation therefore becomes troublesome. Accordingly, to enable the heated workpiece 3 to be stamped by the punch 2 even without movement, the punch 2 and the laser head 18 are, for example, positioned so that the axial center of the punch 2 and the firing axis of the laser beam become coaxial.

Further, the laser generator 6 is set in power, frequency, duty ratio, heating time (firing time), defocus (focal distance), and other heating conditions so that the temperature of the lasering surface 20 becomes less than the melting point of the workpiece 3 and so that the working load becomes smaller than the buckling load of the punch 2 due to softening of the workpiece 3 accompanying heating by the laser beam.

That is, during heating by the laser beam, the temperature of the workpiece 3 becomes the highest at the lasering surface 20. The workpiece 3 most easily melts at the lasering surface 20. Therefore, the heating conditions by the laser generator 6 are set so that the temperature of the lasering surface 20 becomes less than the melting point of the workpiece 3 and so that the working load becomes smaller than the buckling load of the punch 2.

Note that, from the viewpoint of reducing the deformation region which occurs at the surroundings of a hole 4 along with stamping and for reducing the energy required for the heating, the heating region of the lasering surface 20 is preferably small. Accordingly, for example, the laser spot diameter is set to about 10 times the diameter of the punch 2.

The control means 8, for example, is comprised of a microprocessor which outputs control signals for controlling the drive operations of the laser generator 6, punch driving means 7, etc. based on detection signals which are input from various types of sensors. That is, the control means 8 is comprised of a CPU for performing control processing and operational processing, a ROM, RAM, or other storage device for storing various types of data and programs, an input device, an output device, etc.

Further, the control means 8 controls the laser generator 6 and punch driving means 7 so that the workpiece 3 starts to be stamped by the punch 2 after the laser generator 6 stops generating the laser beam and a laser beam no longer strikes the lasering surface 20. That is, the control means 8 controls the laser generator 6 and punch driving means 7 so that the punch 2 is not damaged by the fired laser beam and so that the stamping is ended before the deformation resistance exceeds the buckling load of the punch 2 after heating by the laser beam is stopped.

That is, there is a time lag from when a control signal is output from the control means 8 to the punch driving means 7 for driving the punch 2 to when the punch 2 actually hits the workpiece 3 and stamping starts. For example, when the punch driving means 7 is the air cylinder 12, a time lag occurs due to the steps of output of the control signal, start of application of current to a solenoid valve 23 for turning on/off the introduction of high pressure air, start of the operation of the air cylinder 12 along with the introduction of high pressure air, and the start of stamping by the punch 2.

Therefore, in consideration of this time lag, to enable the control means 8 to output a control signal for driving the punch 2 a predetermined time before the generation of the laser beam is stopped, for example, a time monitoring means is provided for monitoring the elapsed time from the start of generation of the laser beam.

The piercing method by the piercing apparatus 1 of the present embodiment will be explained using FIG. 3A, FIG. 3B, FIG. 3C, and FIG. 3D. The piercing method using the piercing apparatus 1 includes a local heating step for using the laser generator 6 to locally heat part of the workpiece 3 in a temperature range less than a melting point of the workpiece 3 and a stamping step for using the punch driving means 7 to drive the punch 2 in an axial direction toward the part of the workpiece 3 which was heated by the local heating step and using the punch 2 to stamp the workpiece 3. Below, the piercing method by the piercing apparatus 1 will be explained focusing on the local heating step and the stamping step.

First, before the local heating step, the workpiece 3 is set at the workpiece holding means 9. That is, the workpiece 3 is placed on the workpiece setting table 14 (see FIG. 3A), then the workpiece 3 placed on the workpiece setting table 14 is held down by the workpiece holder 15 (see FIG. 3B).

Next, the laser generator 6 is made to operate to start the local heating step. Due to this, a laser beam is fired at the lasering surface 20 of the workpiece 3 so as to form a laser spot of a predetermined diameter (see FIG. 3B). Part of the workpiece 3 is heated to soften to an extent not melting so that at that part of the workpiece 3, the deformation resistance becomes smaller than the buckling load of the punch 2. Further, simultaneously with the start of generation of the laser by the laser generator 6, the time starts to be monitored for start of driving the punch 2.

Further, after the elapse of the time set by the time monitoring means, a control signal is output from control means 8 to the punch driving means 7 for driving the punch 2, then, after the elapse of the set heating time, the generation of a laser beam by the laser generator 6 is stopped. Due to this, the once rising temperature of the workpiece 3 starts to fall and the deformation resistance starts to increase.

Finally, the stamping step is started in accordance with a control signal for driving the punch 2. That is, in accordance with the output of the control signal, the punch 2 is driven toward the workpiece 3 and stamping is begun. At this time, the laser beam is no longer striking the lasering surface 20, so the situation of the punch 2 being hit by the laser beam is avoided. Further, the stamping is ended before the workpiece 3 cools too much and the deformation resistance ends up exceeding the buckling load of the punch 2 (see FIG. 3C), then the punch 2 is pulled up (see FIG. 3D).

The piercing apparatus 1 of the present embodiment comprises the laser generator 6 which locally heats part of the workpiece 3 in a temperature range less than the melting point of the workpiece 3 and with the punch driving means 7 which drives the punch 2 in the axial direction toward the part of the workpiece 3 which was heated by the laser beam. Due to this, it is possible to cause the workpiece 3 to locally soften to locally cause the formation of a part with a small deformation resistance and to stamp the part with the small deformation resistance by the punch 2, so it is possible to reduce the possibility of buckling of the punch 2 and easily pierce the hole 4 with a large L/D.

Further, the process of piercing the hole 4 becomes stamping using the punch 2 plus local heating of the workpiece 3, so the processing time does not become that long and the productivity does not fall either. Furthermore, since stamping is used to pierce the hole 4, the work quality does not fall either. Due to the above, it is possible to provide the piercing apparatus 1 enabling achievement of both good productivity and work quality which can pierce the hole 4 with a large L/D while reducing the possibility of buckling of the punch 2.

Further, since the workpiece 3 is not heated and softened as a whole, but is locally heated and softened, it is possible to reduce the deformation region occurring in the surroundings of the hole 4 accompanying stamping and possible to reduce the energy which is required for heating.

Furthermore, when using stamping to pierce the hole 4, usually a die is necessary. It is necessary to align the position of the workpiece 3 where the hole 4 is to be pierced and the die, then use the punch 2 to stamp the workpiece 3. That is, it is necessary to support the workpiece 3 by the die cutting edges formed by the peripheral edges of the die hole against the pressing force by the punch 2 so that the die cutting edges cause cracks in the workpiece 3 and remove the material corresponding to the hole 4.

As opposed to this, according to the piercing apparatus 1, since the workpiece 3 is locally heated to soften, it is possible to utilize the difference in deformation resistances caused by the temperature difference so as to remove the material corresponding to the hole 4. For this reason, it is possible to pierce a hole 4 in the workpiece 3 without using a die, so when the shape of the workpiece 3 makes it difficult to place a die, it is possible to pierce the hole 4 without having to struggle to place a die. Further, since part of the workpiece 3 is heated by the laser which is generated by the laser generator 6, it is possible to freely change the heating region, heating temperature, and other settings at the workpiece 3.

Further, laser generator 6 sets the heating conditions by the laser so that the temperature of the lasering surface 20 becomes less than the melting point of the workpiece 3 and so that softening of the workpiece 3 accompanying heating causes the working load to become smaller than the buckling load of the punch 2. Due to this, it becomes possible to reliably prevent the punch 2 from buckling while keeping the workpiece 3 from melting and the hole diameter precision and surface properties from dropping.

Further, the control means 8 has a time monitoring means for monitoring the elapse of time from the start of laser generation so that the workpiece 3 starts to be stamped by the punch 2 after the laser generator 6 stops generation of the laser beam and the laser beam no longer strikes the laser surface 20. Due to this, it possible to prevent the laser beam from damaging the punch 2 and possible to end the stamping by the punch 2 before cooling after stopping the laser heating causes the deformation resistance to increase.

Figure 4:
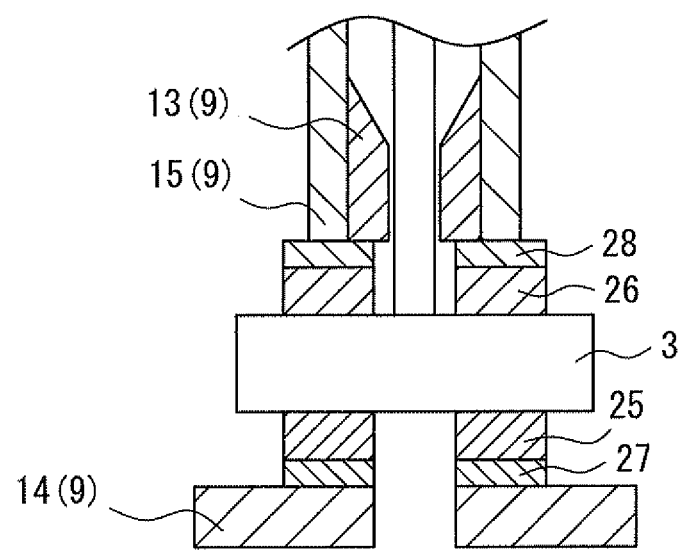
FIG. 4 is a cross-sectional view showing the configuration of principal parts of a piercing apparatus according to a modification of an embodiment of the present invention.

The piercing apparatus 1 is not limited to the above embodiments. Various modifications may be considered. For example, in the piercing apparatus 1 of the above embodiment, the laser generator 6 was used as the local heating means, but as shown in FIG. 4, it is also possible to run current to part of the workpiece 3 and use the Joule's heat to heat part of the workpiece 3 to soften. That is, it is also possible to arrange electrodes 25, 26 and insulating materials 27, 28 at the workpiece setting table 14 and workpiece holder 15, use the electrodes 25, 26 to sandwich part of the workpiece 3, and run current through part of the workpiece 3 to use the Joule's heat to heat and soften part of the workpiece 3.

While the invention has been described by reference to specific embodiments chosen for purposes of illustration, it should be apparent that numerous modifications could be made thereto by those skilled in the art without departing from the basic concept and scope of the invention.

The invention claimed is:

1. A piercing method for use with a processor and for driving a columnar shaped punch in an axial direction to pierce a hole in a workpiece, the workpiece including: (i) a lasering surface, and (ii) a punching surface that a front end of the punch hits, the method comprising successive steps of:
   a local heating step of locally heating the lasering surface of the workpiece in a temperature range that is less than a melting point of the workpiece using a laser generator by emitting a laser beam from the laser generator, the laser beam directly striking the lasering surface of the workpiece;
   an output step of outputting a control signal from the processor to a punch drive that initiates driving of the punch in an axial direction towards the punching surface of the workpiece;
   a laser generator stopping step of stopping the emission of the laser beam by the laser generator such that the laser beam no longer strikes the lasering surface of the workpiece before the punch contacts the punching surface of the workpiece; and
   a stamping step of stamping the workpiece by the punch during the driving of the punch such that the punch contacts the punching surface of the workpiece and pierces the hole in the workpiece, the laser generator being positioned during the stamping step such that a central axis of a path on which the laser beam is projectable therefrom is coaxial with a central axis of the punch, wherein
   the processor performs a step of monitoring an elapsed time from a start of the emission of the laser beam such that the workpiece starts to be stamped by the punch after the laser generator stops emission of the laser beam and the laser beam no longer strikes the lasering surface of the workpiece.

2. The piercing method as set forth in claim 1, wherein said punch receives a working load as a reaction force from the workpiece while stamping the workpiece, and the working load is smaller than a buckling load of the punch due to the softening of the workpiece accompanying heating by the local heating step.

3. The piercing method as set forth in claim 1, wherein the lasering surface of the workpiece that is heated in the local heating step is positioned at an opposite side of the punching surface of the workpiece that the front end of the punch hits.

4. The piercing method as set forth in claim 1, wherein:
   the punch pierces the hole in the workpiece by stamping the workpiece from the punching surface toward the lasering surface and receives a working load as a reaction force from the workpiece while stamping the workpiece, and
   the temperature of the lasering surface is less than the melting point of the workpiece such that softening of the workpiece by heating in the local heating step causes the working load to become smaller than a buckling load of the punch.

* * * * *